(12) United States Patent
Ishikawa et al.

(10) Patent No.: US 7,302,965 B2
(45) Date of Patent: Dec. 4, 2007

(54) SADDLE TAP

(75) Inventors: Kazuo Ishikawa, Osaka (JP); Takashi Terada, Osaka (JP)

(73) Assignee: Tabuchi Co., Ltd. (JP)

( * ) Notice: Subject to any disclaimer, the term of this patent is extended or adjusted under 35 U.S.C. 154(b) by 0 days.

(21) Appl. No.: 11/593,225

(22) Filed: Nov. 6, 2006

(65) Prior Publication Data
US 2007/0113895 A1 May 24, 2007

(30) Foreign Application Priority Data
Nov. 22, 2005 (JP) .............................. 2005-337339

(51) Int. Cl.
*F16L 55/18* (2006.01)
(52) U.S. Cl. .................. 137/318; 285/197; 408/137
(58) Field of Classification Search ............... 137/318; 285/197; 408/137
See application file for complete search history.

(56) References Cited
U.S. PATENT DOCUMENTS
5,286,070 A * 2/1994 Williams .................. 285/197
6,202,673 B1 * 3/2001 Bunger ...................... 137/318
6,709,022 B1 * 3/2004 Daumas et al. ............. 285/197
6,758,237 B2 * 7/2004 Sichler et al. .............. 137/318
6,907,896 B1 * 6/2005 Christodoulou et al. .... 137/318

FOREIGN PATENT DOCUMENTS
| JP | 2000-179777 | 6/2000 |
|----|-------------|--------|
| JP | 2000-240880 | 9/2000 |
| JP | 2001-200978 | 7/2001 |
| JP | 2004-044678 | 2/2004 |

\* cited by examiner

*Primary Examiner*—Kevin Lee
(74) *Attorney, Agent, or Firm*—Thompson Hine LLP

(57) ABSTRACT

A saddle tap to be mounted on a resin pipe, includes a saddle, a branching barrel including a straight piping portion having an internally threaded hole longitudinally extending therealong, and a branch portion extended from the middle of the straight piping portion, the straight piping portion standing at one end thereof on the saddle, a hole-drilling cutter with a rotating tool detachably connected thereto, and having, at one end thereof, a cutting edge integrally formed therewith, the hole-drilling cutter having an externally threaded barrel portion and being screwed into the internally threaded hole of the straight piping portion so that the hole-drilling cutter is longitudinally movable, and a cap detachably mounted on the other end of the straight piping portion of the branching barrel for closing the internally threaded hole.

7 Claims, 7 Drawing Sheets

SADDLE TAP

This application claims priority from Japanese Patent Application No. 2005-337339 filed on Nov. 22, 2005, the entire contents of which are incorporated herein by reference.

BACKGROUND OF THE INVENTION

1. Field of the Invention

The present invention relates to a saddle tap for a resin pipe for connecting a branch pipe to a resin main pipe made of polyethylene and, in particular, to a saddle tap having a water stop structure with a hole-drilling cutter.

2. Description of the Related Art

Water main pipes are currently typically made of polyethylene or other resins, because resins outperform metals in earthquake resistance and corrosion resistance. Many saddle taps have been proposed which can be installed in a main pipe with water left continuously running through the main pipe as disclosed in Japanese Laid-open Gazettes Nos. 2001-200978, 2000-240880, 2000-179777, and 2004-44678.

Conventional saddle taps for resin pipe are categorized into two types. One type has a water shut-off function while the other type has no water shut-off function. The saddle tap having no water shut-off function is simple in structure with a smaller number of components, and less costly. The saddle tap having the water shut-off function is complex in structure with a large number of components, and costly. When valve closing is required to conduct pressure tests or to modify branch line piping, the saddle tap with the water shut-off function is required. The saddle tap for resin pipe disclosed in Japanese Laid-open Gazette No. 2001-200978 includes a cylinder core inserted into a tapping hole of a water main pipe as a valve seat and a hole drilling cutter as a valve plug. The hole drilling cutter is received in the cylinder core in a watertight fashion. The disclosed saddle tap thus performs the water shut-off function with a relatively small number of components in a cost-effective manner.

In terms of watertightness with the resin main pipe, the conventional saddle taps for resin pipe are categorized into electro-fusion types and gasket types. The electro-fusion type saddle tap includes an electrically-heated wire in a resin saddle, and achieves watertightness by thermally fusing the saddle onto the surface of the resin main pipe. The gasket type saddle tap includes a gasket in a saddle mounted on the water main pipe. The gasket is tightly secured onto the surrounding of a tapping hole of the main water pipe. Watertightness is assured by screwing a cylindrical core into the tapping hole with the gasket inserted.

FIGS. 6 and 7 illustrate a conventional saddle tap. The saddle tap includes an electrically heated wire in a saddle 51 and a junction port 52 of a resin body 50 to be mounted on the surface of a resin main pipe P. A T-shaped tapping resin barrel 53 forming a tapping passage is inserted into the junction port 52 of the body 50. In this arrangement, the saddle 51 is thermally fused with the resin main pipe P and the tapping resin barrel 53 is thermally fused with the junction port 52 to achieve watertightness. A cylindrical hole-drilling cutter 55 is vertically movably screwed into an internally threaded through-hole 54 of the tapping resin barrel 53. A rotating tool (not shown), received in a hexagonal socket 56 on the top portion of the hole-drilling cutter 55, is rotated in a normal direction to move the hole-drilling cutter 55 downward to drill a tapping hole 57 in the resin main pipe P. By rotating the rotating tool in a reverse direction, the hole-drilling cutter 55 is raised with a cut piece 58 held therewithin. The tapping hole 57 is now opened to tap water. After a hole drilling operation, a cap 59 is detachably mounted on the top of the tapping resin barrel 53 to close the internally threaded through-hole 54.

The above-referenced saddle tap, although simple-structured and low-cost, provides no water shut-off function. With the hole-drilling cutter 55 lowered as shown in FIG. 7, the cutter is inserted into the tapping hole 57. In this setting, the watertightness is not sufficiently provided around the hole-drilling cutter 55. Water leaks through a screw engagement 60 between the internally threaded through-hole 54 of the tapping resin barrel 53 and the hole-drilling cutter 55 out into a tap junction 61.

The electro-fusion type saddle tap includes a single upper saddle while the gasket type saddle tap includes an upper saddle and a lower saddle to clamp the main water pipe and thus has a larger component count. The saddle tap disclosed in Japanese Laid-open Gazette No. 2001-200978 is of the gasket type. In this saddle tap, the hole-drilling cutter drills the tapping hole while a cylindrical core is screwed into the tapping hole by self-tapping at the same time. During the hole drilling operation, a large torque is required for the self-tapping. When water is run after the hole drilling, the hole-drilling cutter 55 needs to be raised while the cylindrical core is left in the tapping hole. During the hole drilling operation and the screwing operation, the hole-drilling cutter 55 is rotated integrally with the cylindrical core in the normal rotation. During the reverse rotation, the hole-drilling cutter 55 is raised with the cylindrical core disengaged therefrom in a one-way clutch mechanism. The mechanism requires a complex structure. The tapping hole formed in the resin pipe can deform with pressure or time, and a long-term watertightness cannot be expected between the tapping hole and the cylindrical core.

SUMMARY OF THE INVENTION

The present invention has been developed in view of these problems, and it is an object of the present invention to provide a saddle tap with water shut-off function featuring a simple structure and less components.

In accordance with one aspect of the present invention, a saddle tap to be mounted on a resin pipe comprises a saddle mounted on the resin pipe; a branching barrel including a straight piping portion having an internally threaded hole longitudinally extending therealong and a branch portion extended from the middle of the straight piping portion, wherein the straight piping portion stands at the one end thereof on the saddle; a hole-drilling cutter with a rotating tool detachably connected thereto, and having, at one end thereof, a cutting edge integrally formed therewith, wherein the hole-drilling cutter has an externally threaded barrel portion and is screwed into the internally threaded hole of the straight piping portion so that the hole-drilling cutter is longitudinally movable; and a cap detachably mounted on the other end of the straight piping portion of the branching barrel for closing the internally threaded hole. The straight piping portion of the branching barrel further includes at the other end thereof a valve seat having a valve hole communicating with the internally threaded hole thereof so that the cutting edge of the hole-drilling cutter is inserted in the valve hole in a watertight manner.

The saddle tap includes a type composed of an upper saddle and a lower saddle to clamp the resin pipe. However, the present invention also provides a fusion type saddle tap that is fuse-bonded to a portion of the outer circumference of the resin pipe. The fusion type saddle tap does not require a lower band and a gasket for a tapping hole and has a smaller component count. The saddle of the fusion type saddle tap is molded of a resin, and an electrically-heated wire is embedded in the saddle that is to be mounted on the resin pipe. The saddle and the resin pipe are fuse-bonded to each other at the interface therebetween. The saddle is thus mounted onto the resin pipe in a watertight manner. If the branching barrel and the saddle are separate components, a junction hole is drilled through the center of the saddle to receive the lower end of the branching barrel. The lower end portion of the straight piping portion of the branching barrel is received in the junction hole. An electrically-heated wire is embedded around the junction hole. The branching barrel made of a resin is fuse-bonded to the junction hole of the saddle in a watertightness manner.

The hole-drilling cutter is lowered and exposed out of the valve seat arranged on the lower end of the branching barrel to drill a tapping hole in the resin pipe such as a water main pipe. During the drilling operation, or again subsequent to the drilling operation, the hole-drilling cutter is lowered until the cutting edge penetrates through the valve seat. Watertightness is thus assured between the cutting edge and the valve hole, and water shut-off is thus achieved.

The water shut-off feature of the fusion type saddle tap is further described. If the fusion technique is not employed, heat resistance characteristics are not required of the ring seal and the bush. In a water shut-off structure using the hole-drilling cutter as a valve body, a seal means such as an 0-ring is loaded between the cutting edge and the valve hole of the valve seat. The seal means is arranged in the valve hole of the valve seat, or on the cutting edge of the hole-drilling cutter. More specifically, a heat-resistant ring seal having an inner diameter is arranged on a portion of the inner circumference of the valve hole of the valve seat so that the cutting edge of the hole-drilling cutter is engaged with the inner circumference of the ring seal in a watertight manner. Alternatively, a ring seal having an outer diameter is arranged on a portion of the outer circumference of the cutting edge of the hole-drilling cutter so that the outer circumference of the ring seal is engaged with the inner circumference of the valve hole in a watertight manner. If the seal is an O-ring, circular grooves are formed in the valve hole and the cutting edge to receive the O-ring. If the valve seat is arranged in the close vicinity of the electrically-heated wire, the seal arranged in the valve hole is preferably heat-resistant in order to be free from deformation and deterioration during fusion.

The valve seat may be integrally resin-molded with the branching barrel at the lower end thereof. The component count may be reduced in this case. As the saddle, the branching barrel is made of a thermally fusible resin, and the valve seat is close to the electrically-heated wire. Therefore, the valve seat is preferably separate from the branching barrel and made of a heat-resistant material. More specifically, a bush having a center hole as the valve hole is engaged the lower end of the straight piping portion of the branching barrel in a watertight manner. The bush is preferably made of a metal.

The bush includes an external thread portion on the outer circumference thereof, and the straight piping portion of the branching barrel includes a recess portion on the bottom end face of thereof, into which the external thread portion is screwed. The bush is screwed into the recess portion onto a heat-resistant ring seal. This arrangement is advantageous because a conventional tap is used by forming a recess having a thread portion on the branching barrel. The screwing of the hole-drilling cutter in the internally threaded hole of the branching barrel is in a reverse screwing relationship with the screwing of the bush in the recess portion of the branching barrel. In this arrangement, the cutting edge, when rotated to be lowered, is free from integral rotation with the heat-resistant bush. The bush is thus prevented from slacking or coming off.

The hole-drilling cutter has a blind-cylinder structure composed of said cutting edge formed cylindrically and said externally threaded barrel portion formed by a solid barrel. With this arrangement, the cutter is solid rather than hollow, thereby providing water shut-off feature.

In accordance with embodiments of the present invention, the saddle tap with the simple structure and small component count thereof provides the water shut-off feature. With the valve seat pre-arranged on the branching barrel, the saddle tap performs hole-drilling and water shut-off operations in a manner free from an substantial increase in torque required to raise and lower the hole-drilling cutter. Unlike in the conventional technique that uses a complex one-way clutch mechanism, only the hole-drilling cutter is operated during the hole drilling and water shut-off operations. In the fusion type saddle tap having the heat-resistant bush as the valve seat separate from the branching barrel, an increased heat resistance is provided. The heat-resistant bush is easily mounted on a conventional tap by simply threading the conventional tap. Without the need for introducing a substantial modification in a conventional manufacturing line, the saddle tap with the water shut-off feature is manufactured. The hole-drilling cutter and the heat-resistant bush are in a reverse screw relationship to each other. During the hole drilling and water shut-off operations, the hole-drilling cutter is prevented from integrally rotating with the bush. The heat-resistant bush is thus free from slackening and coming off the branching barrel. With watertightness assured, the cutting edge is reliably moved. The blind-cylinder hole-drilling cutter has no water passage therethrough, providing a higher degree of water shut-off feature.

DESCRIPTION OF THE PREFERRED EMBODIMENTS

Figure 1:
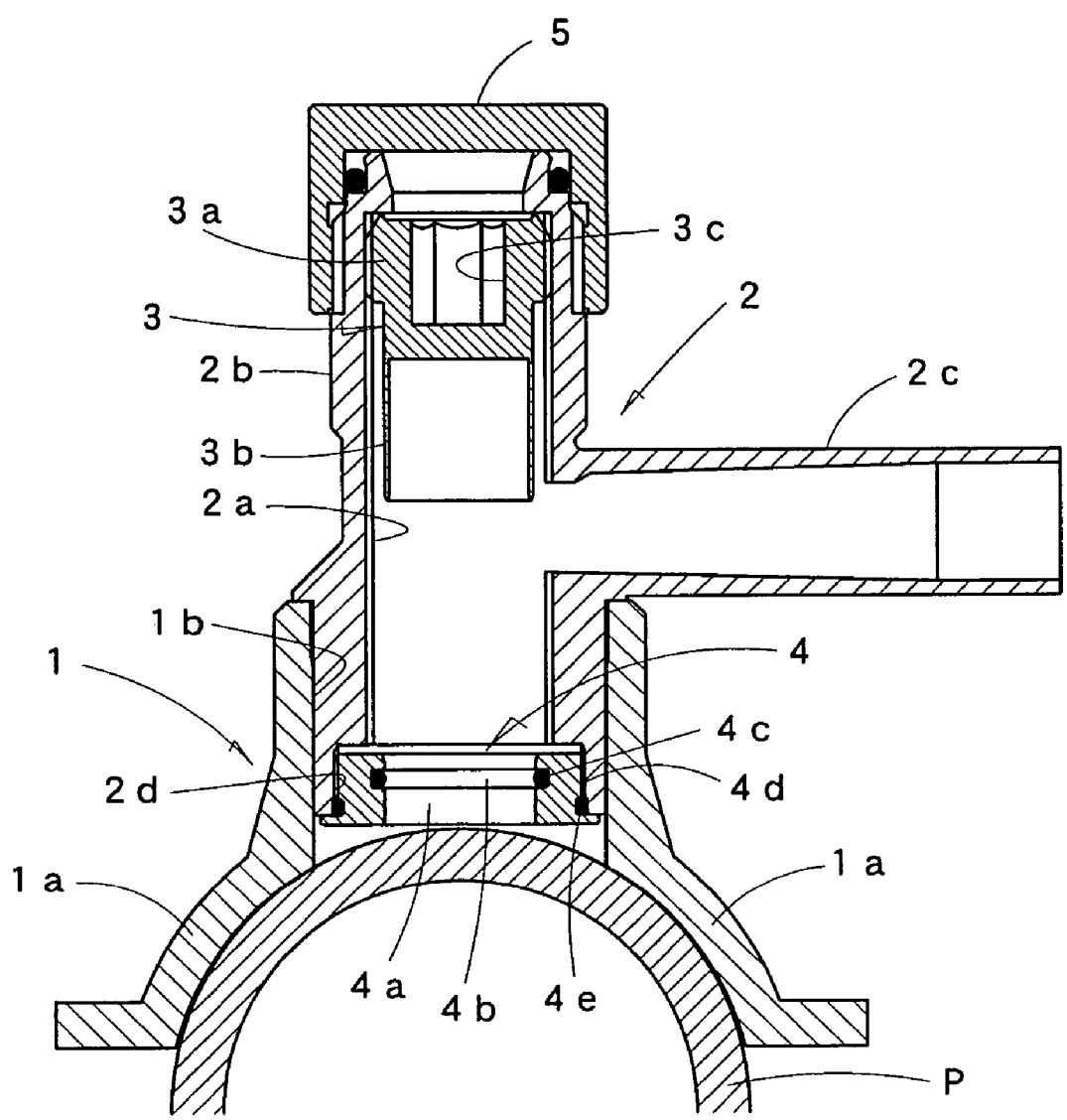
FIG. 1 is a cross-sectional view of a saddle tap prior to a hole-drilling operation in accordance with a first embodiment of the present invention.
Figure 2:
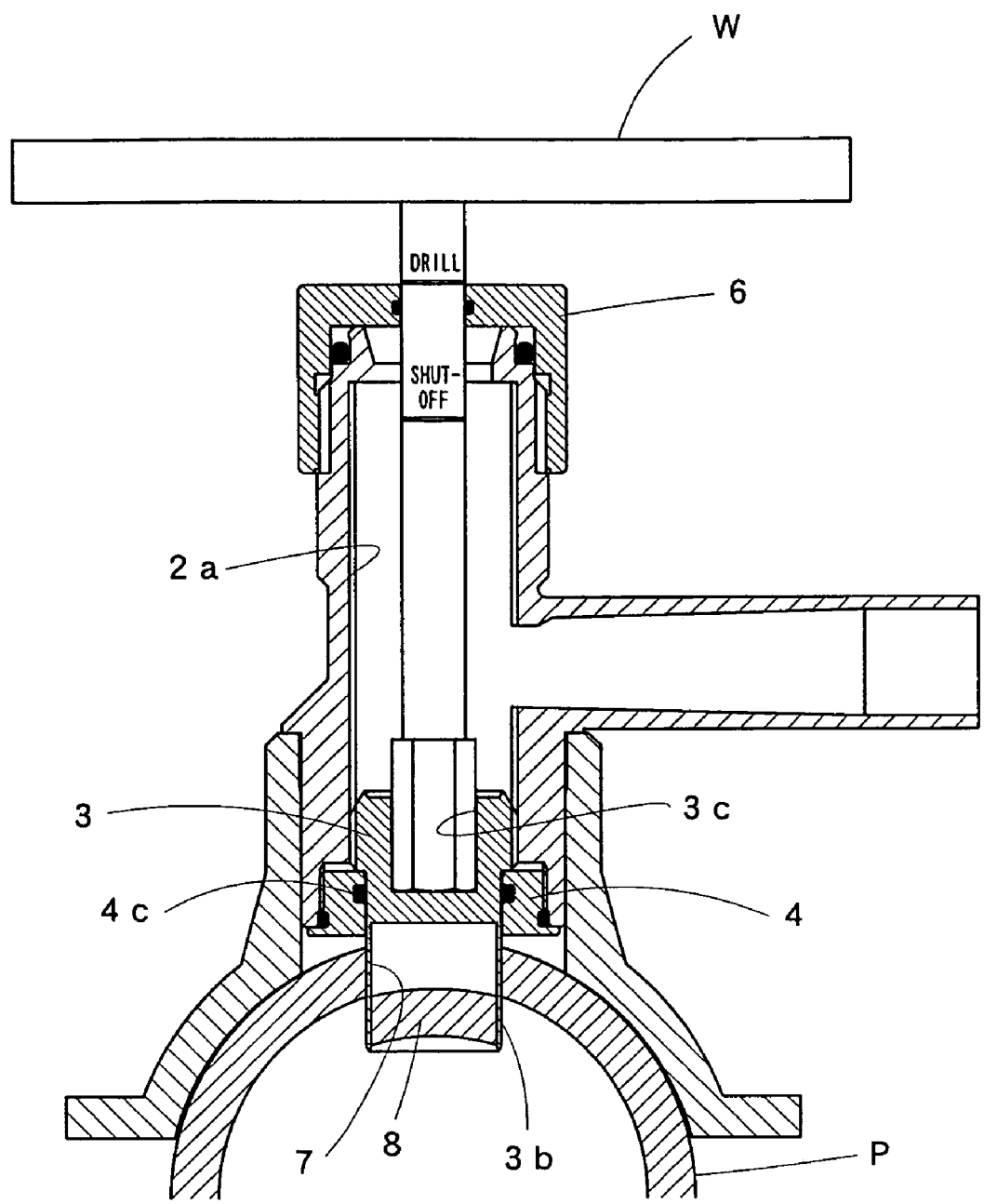
FIG. 2 is a cross-section view of the saddle tap in one of a hole-drilling state and a water shut-off state.
Figure 3:
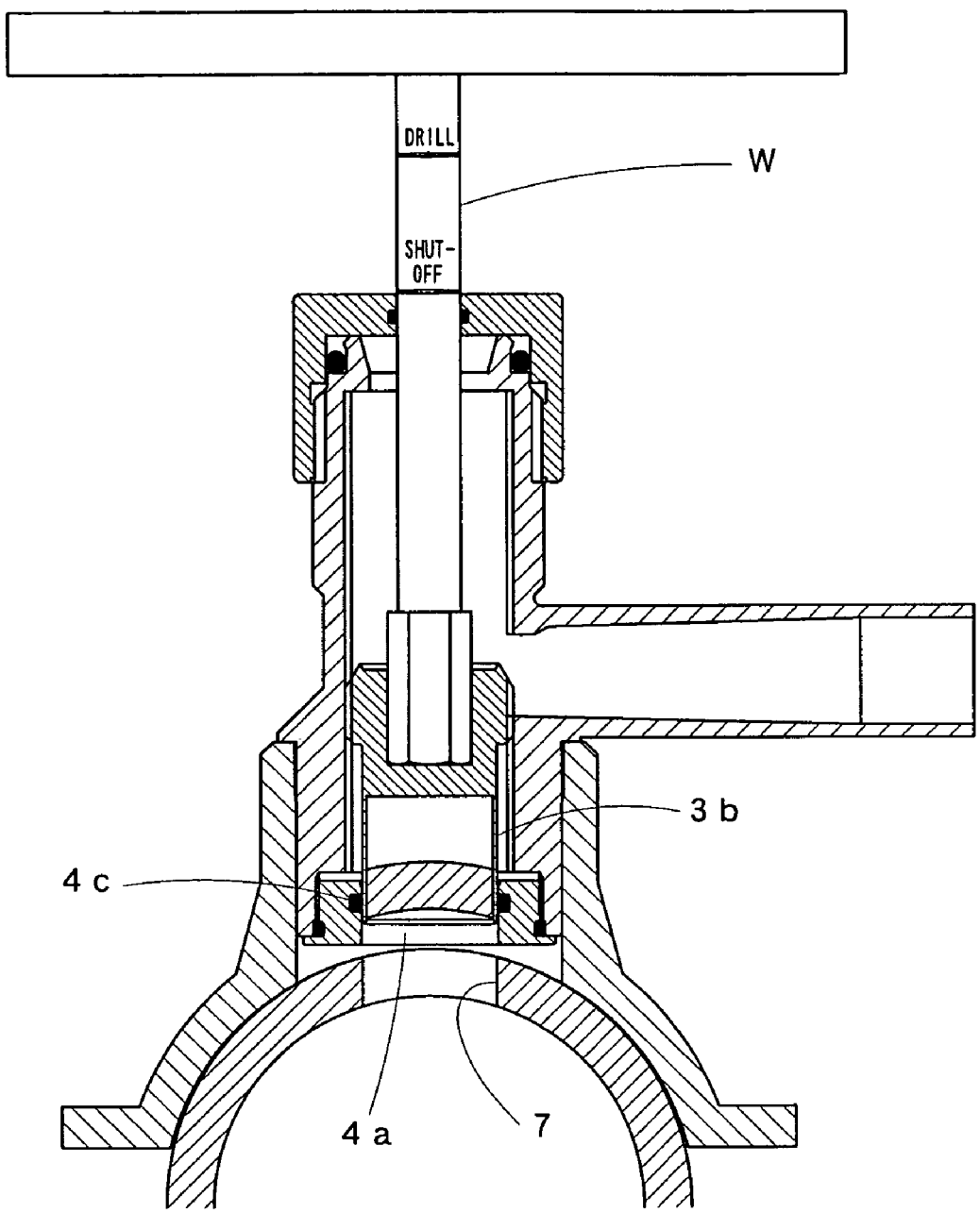
FIG. 3 illustrates the saddle tap in a water-tapping state thereof.

The preferred embodiments of the present invention are described below with reference to the drawings. FIGS. 1 through 3 are cross-sectional views of a saddle tap in accordance with a first embodiment of the present invention. FIG. 1 illustrates the saddle tap prior to the hole-drilling operation, FIG. 2 illustrates the saddle tap with a tapping hole completed, and FIG. 3 illustrates the saddle tap in the water shut-off state thereof.

Figure 6:
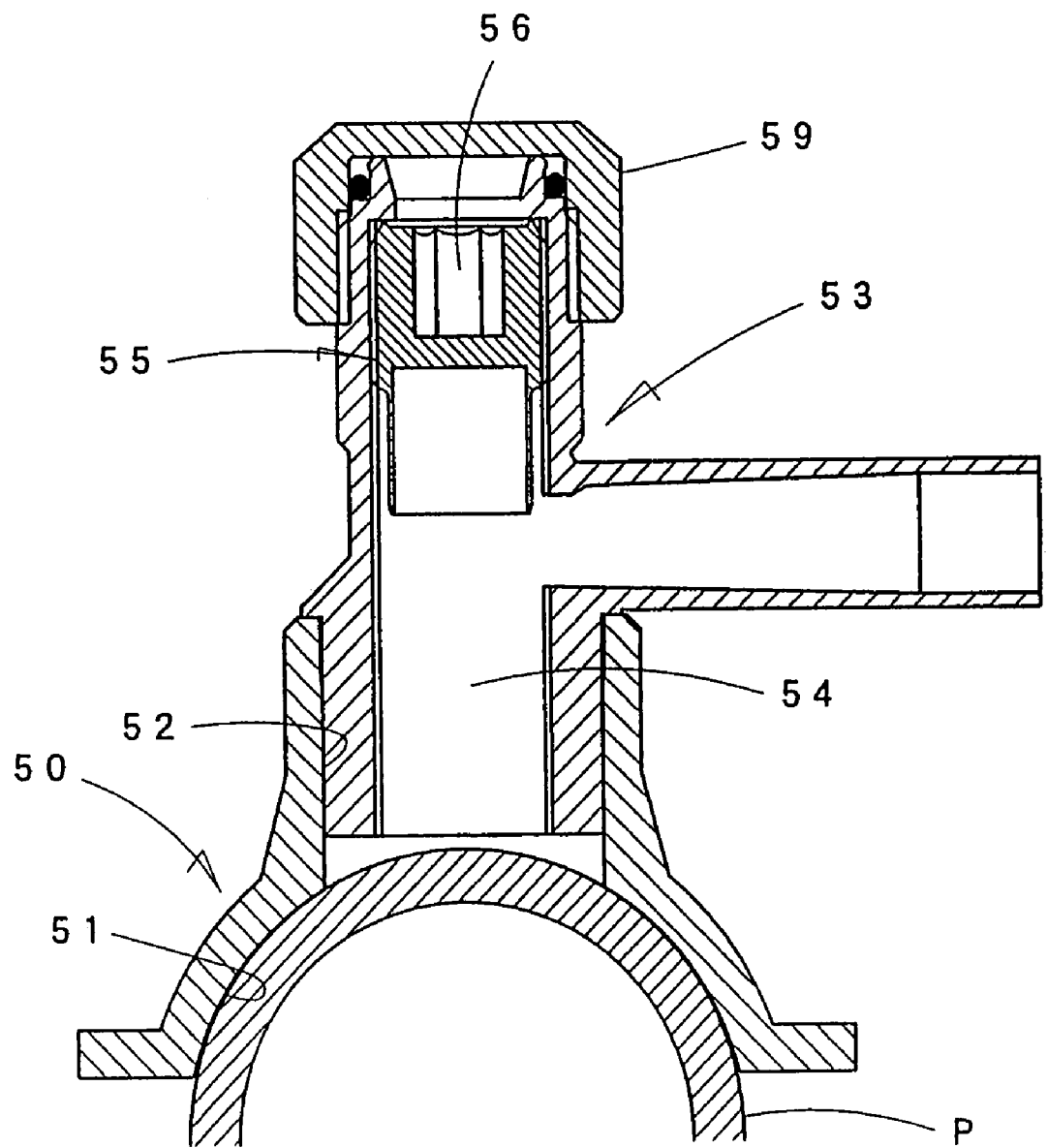
FIG. 6 is a cross-section view of a conventional saddle tap prior to a hole-drilling operation.
Figure 7:
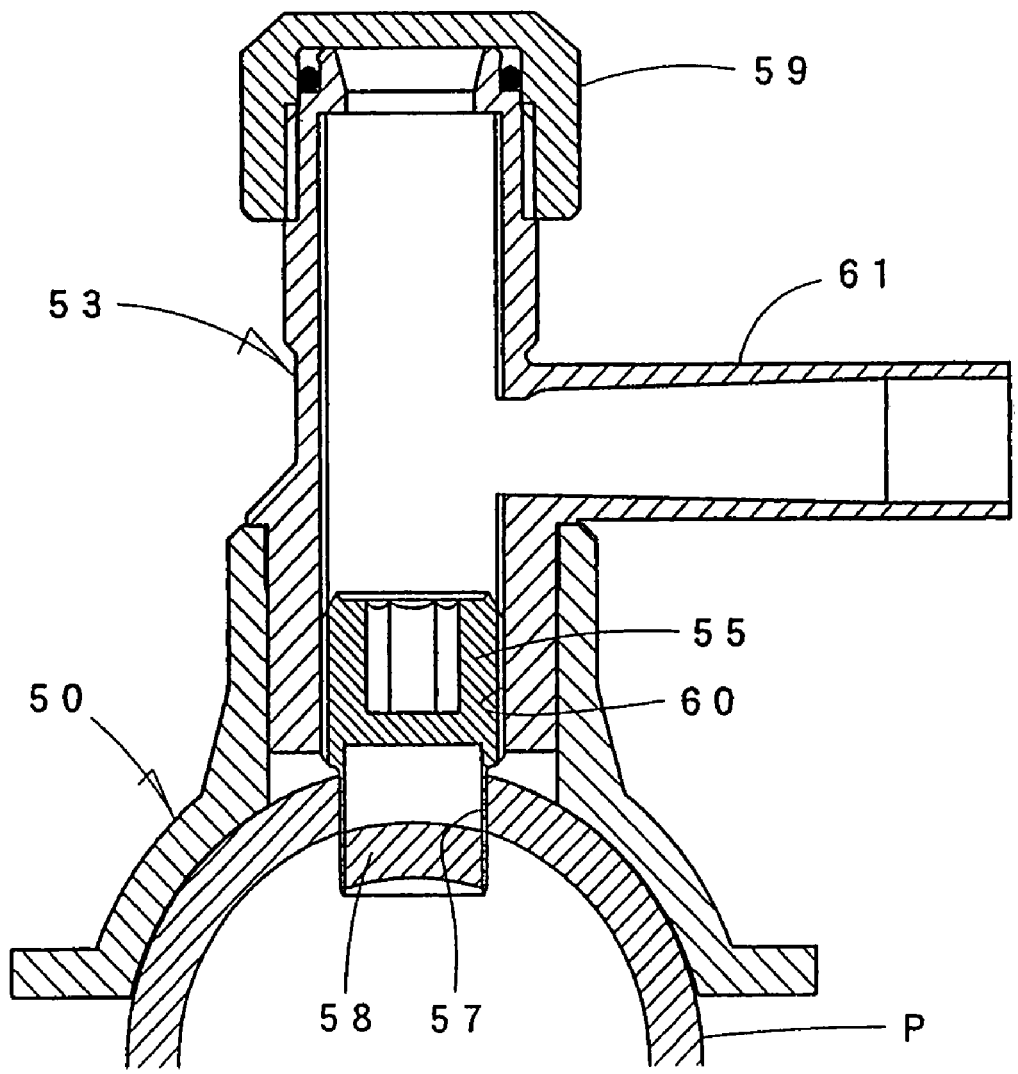
FIG. 7 is a cross-section view of the conventional saddle tap in a hole-drilling state.

The basic structure of the saddle tap shown herein is identical to that of the conventional saddle tap of FIGS. 6 and 7. A saddle 1 includes a saddle mount 1a having an arc configuration in cross section to be mounted onto a resin main pipe P and a junction portion defining a junction hole 1b extending upward from the center of the saddle mount 1a. In accordance with the first embodiment, the saddle 1 is made of a resin, and an electrically-heated wire (not shown) is embedded in the saddle mount 1a and the junction portion 1b. The saddle taps of the first (and second and third embodiments to be discussed later) are of fusion type saddle tap.

A branching barrel 2 is formed into T-shape and includes a straight piping portion 2b with an internally threaded hole 2a along vertical line, and a branching portion 2c horizontally extended from the side of the straight piping portion 2b. The branching barrel 2 is made of a resin. With the branching barrel 2 inserted to the junction hole 1b of the saddle 1, the outer circumference of the lower end of the branching barrel 2 is fused with the inner circumference of the junction portion 1b to assure watertightness.

A hole-drilling cutter 3 includes an externally threaded barrel 3a which is screwed into the internally threaded hole 2a of the branching barrel 2 in a clockwise rotation. In the first embodiment, the externally threaded barrel 3a is a clockwise screw. The hole-drilling cutter 3 has an tubular cutting edge 3b extended from the externally threaded barrel 3a and having a diameter slightly smaller than that of the externally threaded barrel 3a. In the first embodiment, the hole-drilling cutter 3 has a blind cylindrical structure. The hole-drilling cutter 3 further includes a hexagonal socket 3c that can receive a rotating tool W.

A valve seat 4 is characteristic of the present invention. The valve seat 4 is a heat-resistant bush made of a metal. The valve seat 4 includes a valve hole 4a formed vertically as a center hole thereof through which the cutting edge 3b of the hole-drilling cutter 3 can be inserted. A circular groove 4b is formed in the inner circumference of the valve seat 4 defining the valve hole 4a. An O-ring 4c having a diameter allowing the cutting edge 3b of the hole-drilling cutter 3 to pass therethrough with the water shut-off state keeping is loaded in the circular groove 4b. The heat-resistant bush also includes an external thread 4d on the external circumference thereof. The external thread 4d is in a reverse screw relationship with the external thread barrel 3a of the hole-drilling cutter 3. The heat-resistant bush is screwed into a recess portion 2d formed on the bottom end of the branching barrel 2 with a heat-resistant O-ring 4e interposed between the bush and the branching barrel 2. The valve seat 4 is thus mounted to the bottom end of the branching barrel 2 in a watertight manner.

A cap 5 for closing the internally threaded hole 2a is detachably mounted to the top end of the branching barrel 2.

In the saddle tap thus constructed as shown in FIG. 2, the cap 5 is removed from the branching barrel 2, and another covering member 6 is then mounted onto the branching barrel 2. The rotating tool W such as a T-type wrench is inserted through the covering member 6 and then engaged with the hexagonal socket 3c of the hole-drilling cutter 3. As an operator rotates the rotating tool W, the hole-drilling cutter 3 is lowered or raised vertically while being rotated along with the internally threaded hole 2a of the branching barrel 2. In particular, the rotating tool W is rotated clockwise to lower the hole-drilling cutter 3 until the cutting edge 3b projects from the opposite side of the valve seat 4. A branching hole 7 is thus drilled in a resin main pipe P. The level position of the cutting edge 3b can be monitored by arranging an indicator, for example "DRILL" and so on, on a connecting rod of the rotating tool W. The operator can thus monitor by referencing the indicator. A cut piece 8 is held in the cutting edge 3b.

When the hole-drilling operation is complete, the rotating tool W is rotated counterclockwise to raise the hole-drilling cutter 3 holding the cut piece 8 in a direction away from the resin main pipe P. Thus, the water tapping state is reached.

During the hole-drilling operation of the branching hole 7, or again subsequent to the hole-drilling operation, the hole-drilling cutter 3 can be lowered to reach the water shut-off state. More specifically, the hole-drilling cutter 3 is lowered until the cutting edge 3b passes through the heat-resistant O-ring 4c loaded in the valve hole 4a. Watertightness is thus assured between the outer circumference of the cutting edge 3b and the inner circumference of the valve hole 4a, establishing the water shut-off state.

The water shut-off function is performed when the cutting edge 3b reaches the heat-resistant O-ring 4c in the valve hole 4a. In this case, it is not necessary to lower the cutting edge 3b to the position of FIG. 2 where the hole-drilling operation is performed. Even when the hole-drilling cutter 3 is at a level as shallow as the cutting edge 3b is not protruded from the valve hole 4a, and as long as the cutting edge 3b remains inserted in the heat-resistant O-ring 4c, the water shut-off function works. In accordance with this embodiment, the stroke of the rotating tool W required to perform the water shut-off function is small. Since the water shut-off operation is activated at a position where the cutting edge 3b has yet to reach the branching hole 7, the water shut-off operation is correctly performed even when the branching hole 7 is deformed as a result of ground soil pressure and so on. An effective water shut-off range may be monitored by arranging an indicator, for example "SHUT-OFF" and so on, on the connecting rod of the rotating tool W.

In accordance with the first embodiment, the hole-drilling cutter 3 has the blind cylindrical structure having no water passage therethrough. A highly reliable water shut-off feature is achieved. Since the hole-drilling cutter 3 and the heat-resistant bush forming the valve seat 4 are in a reverse screw relationship to each other, the hole-drilling cutter 3 is prevented from being integrally rotated with the heat-resistant bush. In accordance with the first embodiment, the external thread barrel 3a of the hole-drilling cutter 3 is a clockwise screw and the external thread 4d of the heat-resistant bush is a counterclockwise screw. Alternatively, the opposite setting is perfectly acceptable. Namely, the external thread barrel 3a of the hole-drilling cutter 3 may be a counterclockwise screw and the external thread 4d of the heat-resistant bush may be a clockwise screw.

Figure 4:
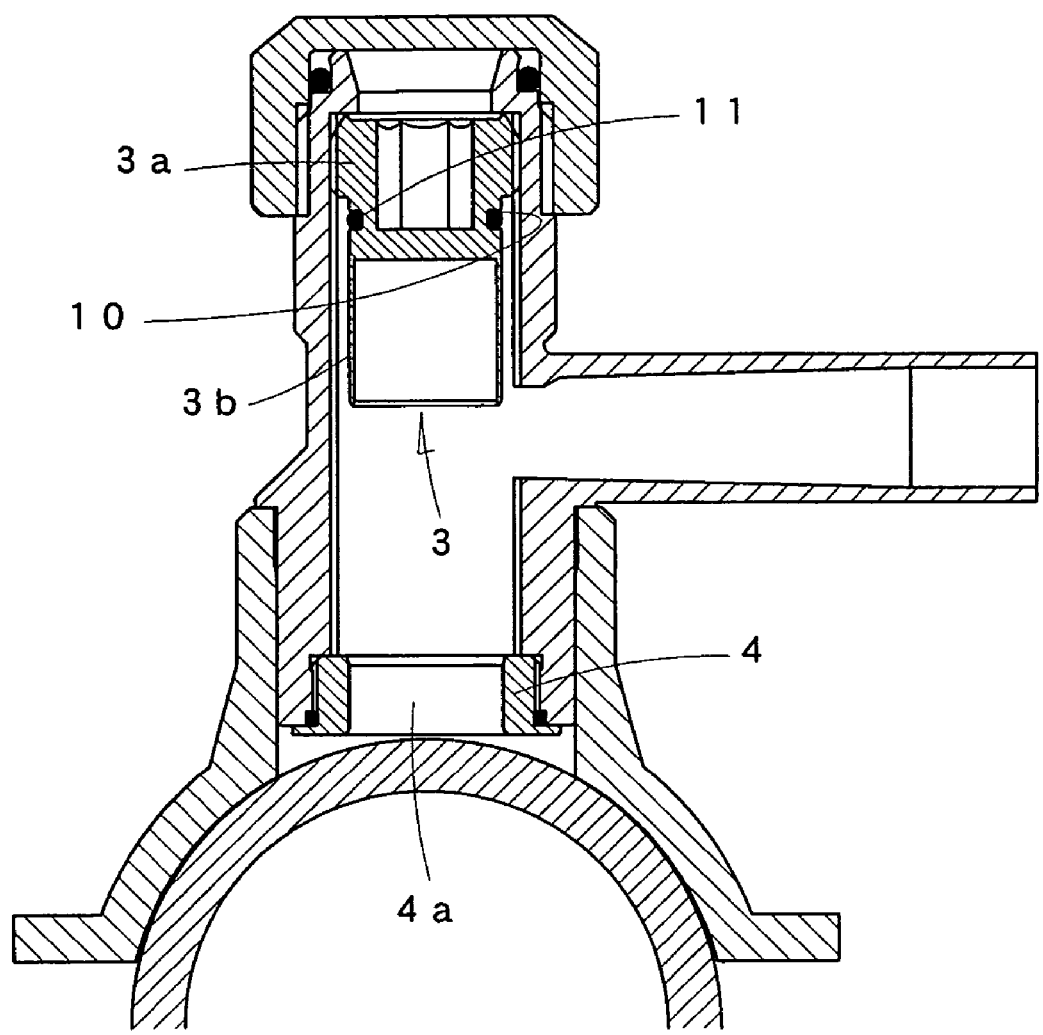
FIG. 4 is a cross-section view of a saddle tap in accordance with a second embodiment of the present invention.

FIG. 4 illustrates a saddle tap of a second embodiment of the present invention. The basic structure of the second embodiment remains unchanged from that of the first embodiment. Only the difference from the first embodiment is discussed. In accordance with the second embodiment of the present invention, the inner circumference of the valve seat 4 defining the valve hole 4a is a straight and smooth surface without the circular groove and the O-ring. A circular groove 10 is formed on the outer surface of the hole-drilling cutter 3 between the external thread barrel 3a and the cutting edge 3b, and an O-ring 11 is loaded in the circular groove 10. As the first embodiment, the second embodiment provides the hole-drilling function and the water shut-off function. The O-ring 11 is not necessarily heat-resistant. Since the O-ring 11 is loaded at a position deep upward, the hole-drilling cutter 3 needs to be lowered to a level deeper in level than the position of the first embodiment to perform the water shut-off function.

Figure 5:
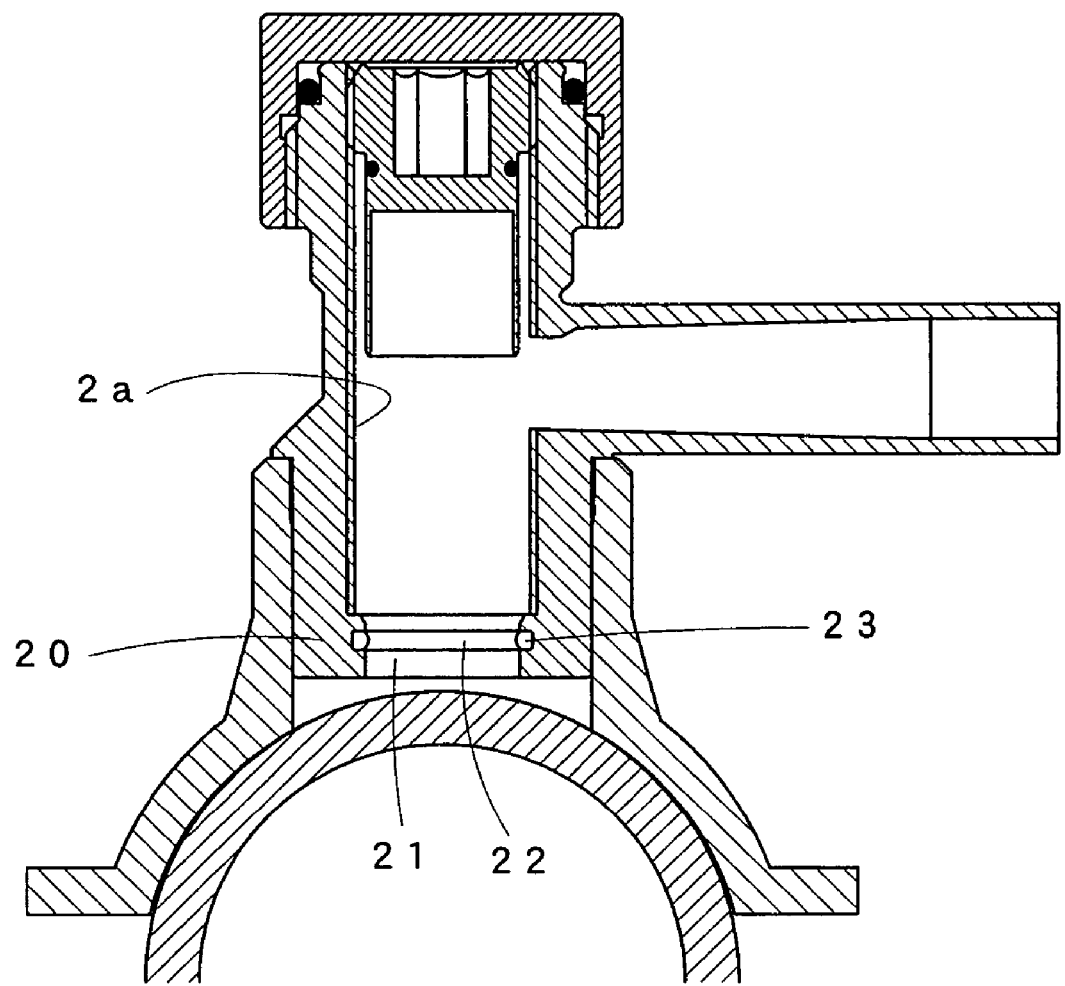
FIG. 5 is a cross-section view of a saddle tap in accordance with a third embodiment of the present invention.

FIG. 5 illustrates a saddle tap in accordance with a third preferred embodiment of the present invention. In the first and second embodiments, the valve seat 4 is formed by arranging the heat-resistant bush separate from the branching barrel 2 at the lower end of the branching barrel 2. In accordance with the third embodiment, a valve seat 20 is integrally formed with the lower end of the branching barrel 2. More specifically, when the branching barrel 2 is molded, a valve hole 21 having a diameter smaller than that of the internal-thread inner circumference 2a is formed in the lower end portion of the branching barrel 2. A circular groove 22 is formed in the inner circumference of the valve seat 20 defining the valve hole 21. A heat-resistant O-ring 23 is loaded in the circular groove 22 to form the valve seat 20. In a manner similar to the first and second embodiment, the valve seat 20 performs the hole-drilling operation and the water shut-off operation. With the heat-resistant bush eliminated, the component count is reduced. However, the fusion property with the saddle 1 and the heat resistance property during the fusion operation, mutually contradictory nature, must be satisfied at the same time.

The water shut-off mechanism of the fusion type saddle tap having the electrically-heated wire embedded in the saddle has been detailed in connection with the first through third embodiments of the present invention. The present invention may be applicable to a saddle tap that is combined with a lower band and clamps the resin main pipe P instead of being directly fuse-bonded to the resin main pipe P. In such a case, heat resistance property is not required of the seal (O-ring) and the bush.

What is claimed is:

1. A saddle tap to be mounted on a resin pipe comprising:
   a saddle mounted on said resin pipe by thermal fusion welding;
   a branching barrel including a straight piping portion having an internally threaded hole longitudinally extending therealong and a branch portion extended from the middle of said straight piping portion, wherein said straight piping portion stands at the one end thereof on said saddle;
   a hole-drilling cutter with a rotating tool detachably connected thereto, and having, at one end thereof, a cutting edge integrally formed therewith, wherein said hole-drilling cutter has an externally threaded barrel portion and is screwed into said internally threaded hole of said straight piping portion so that said hole-drilling cutter is longitudinally movable;
   a cap detachably mounted on the other end of said straight piping portion of said branching barrel for closing said internally threaded hole; and
   a valve seat installed at the one end of said straight piping portion of said branching barrel and having a valve hole communicating with said internally threaded hole of said straight piping portion so that said cutting edge of said hole-drilling cutter is inserted in said valve hole in a watertight manner, wherein
   said valve seat comprises a heat-resistant bush made of a metal, having a center hole as said valve hole and engaged with the other end of said straight piping portion of said branching barrel in a watertight manner.

2. The saddle tap according to claim 1, wherein said saddle is fuse-bonded to a portion of the outer circumference of said resin pipe.

3. The saddle tap according to claim 1, further comprising a ring seal having an inner diameter arranged on a portion of an inner circumference of said valve hole of said valve seat so that said cutting edge of said hole-drilling cutter is engaged with an inner circumference of said ring seal in a watertight manner.

4. The saddle tap according to claim 1, further comprising a ring seal having an outer diameter arranged on a portion of an outer circumference of said cutting edge of said hole-drilling cutter so that said valve hole is engaged with an outer circumference of said ring seal in a watertight manner.

5. The saddle tap according to claim 1, wherein said bush comprises an external thread portion on an outer circumference thereof, wherein said straight piping portion of said branching barrel comprises a recess portion on the other end thereof, into which said external thread portion of said bush in screwed, and wherein said bush is received in said recess portion with a ring seal loaded between said bush and said recess portion.

6. The saddle tap according to claim 5, wherein a screwing of said hole-drilling cutter in said internally threaded hole of said branching barrel is in a reverse screwing relationship with a screwing of said bush in said recess portion of said branching barrel.

7. The saddle tap according to claim 1, wherein said hole-drilling cutter has a blind cylinder structure composed of said cutting edge formed cylindrically and said externally threaded barrel portion formed by a solid barrel.

* * * * *

UNITED STATES PATENT AND TRADEMARK OFFICE
CERTIFICATE OF CORRECTION

PATENT NO. : 7,302,965 B2  Page 1 of 1
APPLICATION NO. : 11/593225
DATED : December 4, 2007
INVENTOR(S) : Kazuo Ishikawa et al.

It is certified that error appears in the above-identified patent and that said Letters Patent is hereby corrected as shown below:

COLUMN 8
Line 36, "in screwed" should read --is screwed--.

Signed and Sealed this

Third Day of June, 2008

JON W. DUDAS
*Director of the United States Patent and Trademark Office*